May 16, 1950
J. S. ANDERSON
2,507,619
DERMAL CLEANER AND SCRAPER HAVING
A "FINGERNAIL" ACTION
Filed Aug. 19, 1946
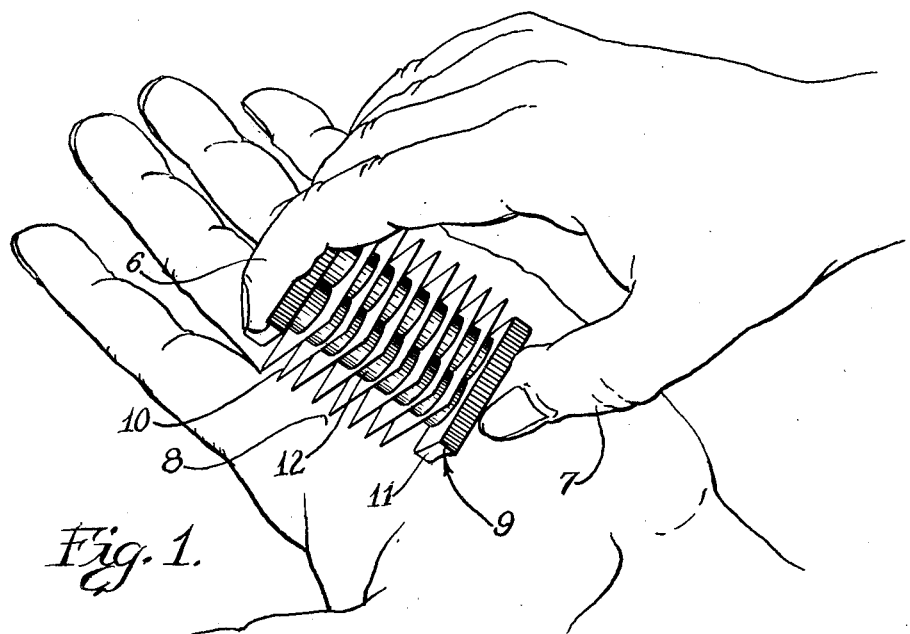
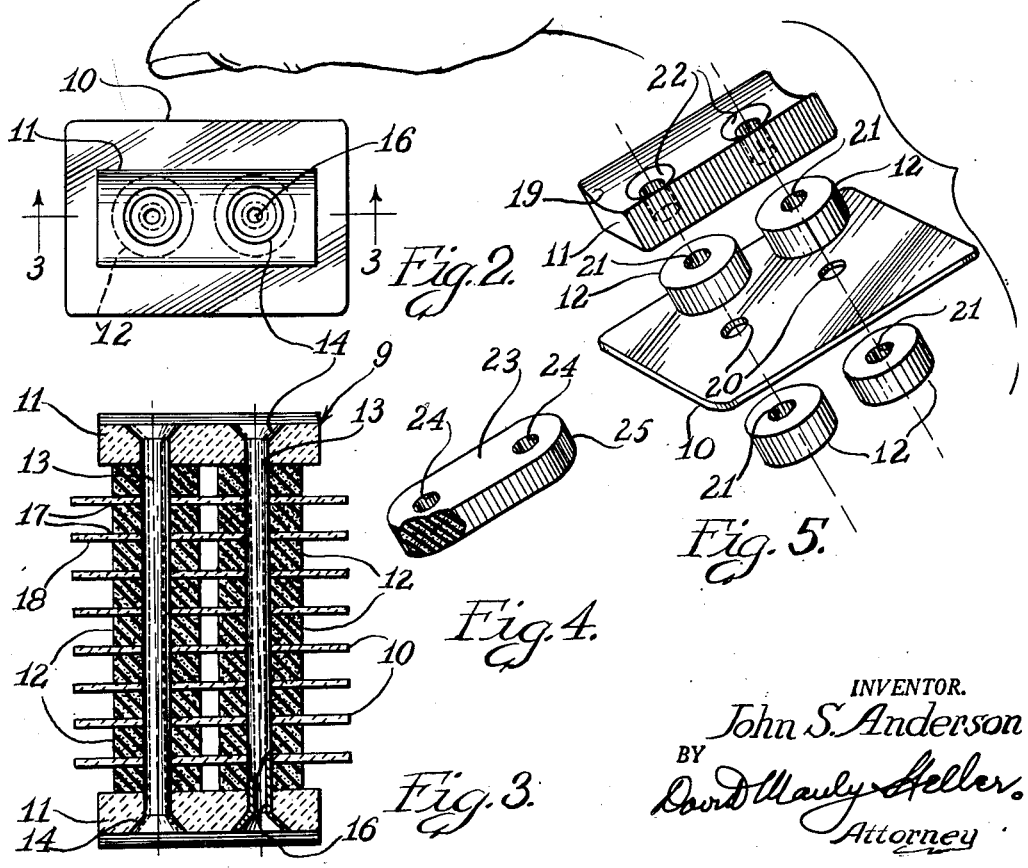
INVENTOR.
John S. Anderson
BY
David Mauly Heller
Attorney Patented May 16, 1950

2,507,619

UNITED STATES PATENT OFFICE 2,507,619

DERMAL CLEANER AND SCRAPER HAVING A "FINGERNAIL" ACTION

John S. Anderson, Chicago, Ill.

Application August 19, 1946, Serial No. 691,560

2 Claims. (Cl. 15—236)

My instant invention appertains to scrapers to be used especially for cleaning the pores of dermal surfaces of the hands, feet, and other parts of the skin of persons; the said scraper being adapted for use, especially, in cleaning the pores of the hands, and to enable removing foreign matter which has become embedded or lodged therein, and which is not soluble in ordinary soap suds.

A further object of my invention is to provide a dermal scraper, for scraping the soles of the feet, for removal of callouses and surplus dead skin, which should be removed, preferably, by the gentle abrasive processes provided by my scraper invention.

A further object of my invention is to provide a scraper of the afore-mentioned character, which consists of two handle elements, a multiplicity of scraper elements made of flexible, resilient, and transparent material, being interconnected by grommet or hollow rivet means, and having interspersed therebetween a series of spacer elements, preferably in the shape of washers made of resilient, or rubber-like material.

It is another object of my invention to provide a scraper of the afore-mentioned character which is practical in construction, efficient for the purposes and uses for which it is purported to be applied, and of such simple elemental construction as to enable, and permit, the manufacture thereof economically in quantity production.

Other features and objects inherent in my invention will become apparent from an examination of the accompanying drawing, bearing further elucidation in the ensuing description, in which like symbols are used to denote like parts, and in which:

Fig. 1 is a perspective view showing the method whereby my invention is manipulated for operation on the palm of the hand.

Fig. 2 is a top view of my invention.

Fig. 3 is a longitudinal cross-sectional view taken, substantially, on the line 3—3 of Fig. 2.

Fig. 4 is a perspective view of a slightly modified spacer element which may be used in connection with my invention.

Fig. 5 is an exploded view indicating, in perspective, the manner of assemblage of the various elements comprising my invention.

The instant application is an improvement on my copending patent application, designated Serial No. 621,295, filed October 9, 1945, now abandoned.

Referring to the various views, Fig. 1 shows how the article, generally designated 9, and comprising my invention, is held between the forefinger 6, and the thumb 7 of one hand, while manipulating the scraper blade edges thereof over the palm 8 of another hand.

The invention generally designated 9 consists of two handle elements designated 11, each having a recess, or concave portion 19, to facilitate holding in the hands which, at the time, may be immersed in soap suds, or may be moist, or wet, to prevent slippage thereof, the said surfaces may also be knurled or roughened, in order to insure a firm grip when held between the fingers of the hand, when the same is grasped and held for manipulative operation as indicated in Fig. 1.

The handle elements 11 have positioned intermediately therebetween a series of rubber washers 12, or elongated duplex washer elements, as illustrated in Fig. 4, and generally designated 23. The duplex element is provided with two holes 24 to fit over the bodies of the hollow grommets, or rivets, having the headed portions 14, and the tubular-like structure providing the passage 16 for moisture, soap suds, and other materials to course therethrough, so that the invention can be kept in a sanitary and clean condition at all times. The elongated duplex washer elements have semi-circular ends 25 to furnish the same effect when flexing of the scraper blades takes place.

An important feature of the invention is the use of the washers 12, which are made of resilient material spaced therebetween properly, the scraper blades 10, which are also made of flexible and resilient material, such as "Lucite," the handles 11 being also made of "Lucite," or similar material, so as to provide a resilience at the point 17, where the scraper blade portions 18 are caused to flex. The circular structure of the washers 12 is ideal, in that it furnishes a neat flexing portion, because it does not interfere with the operation of the flexible portions 18 of the scraper blades 10, and thus maintains the life of the scraper article for a long period of time. It is to be noted that the duplex spacer element is also made of rubber, or resilient material, and is also provided, with two openings, or bores 24, to fit over the body of the hollow rivets or grommets 13. The blades are provided with bores 20, the washers 12 are provided with bores 21, whereas the handles 11 are provided with the countersunk bores 22, to provide suitable location and anchorage for the head 14 of the hollow rivets or grommets 13.

From the above description, it will be obvious, that the instant invention provides a novel implement for scraping the pores of the dermal structure of the human body; the said implement being in itself subject to easy and quick rinsing and cleansing after use, to the end that a sanitary device for the intended purposes is provided.

My scraper is a structural organization of elements furnishing ideal scraping results in that it affords what I term a "fingernail" touch and scraping action.

It is to be understood, that I am not, and do not wish to be, limited to the details of construction shown, since it is readily obvious, and evident, that various equivalent alterations may be made in my invention, without departing from the spirit and scope thereof.

Having thus described and revealed my invention, what I claim as novel and desire to secure by Letters Patent, is:

1. An article of the character described comprising; a pair of outer handle elements; a multiplicity of comparatively thin and resilient rectangular plastic scraper elements confined between the said handle elements and in co-axial relationship therewith, the said scraper elements extending perimetrally beyond the confines of the said handle elements; elongated resilient spacer elements having semi-circular end portions and being of substantially greater thickness than, and intermediately disposed between, adjacent scraper elements; the said handle elements, scraper elements, and spacer elements being provided with coincidental bores at two points on the longitudinal axis thereof; and grommet securing means fitted within the said bores maintaining all the said elements in assemblage; all of the said scraper elements having all edges thereof projected equal distances beyond the perimeters of the said spacer elements affording to the said article scraper elements all the edges of which are free and of equal resiliency.

2. An article of the character described comprising; a pair of outer handle elements; a multiplicity of comparatively thin and resilient rectangular plastic scraper elements confined between the said handle elements and in co-axial relationship therewith, the said scraper elements extending perimetrally beyond the confines of the said handle elements; elongated resilient spacer elements having semi-circular end portions and being of substantially greater thickness than, and intermediately disposed between, adjacent scraper elements; the said handle elements, scraper elements, and spacer elements being provided with coincidental bores at two points on the longitudinal axis thereof; and grommet securing means fitted within the said bores maintaining all the said elements in assemblage; all of the said scraper elements having all edges thereof projected equal distances beyond the perimeters of the said spacer elements affording to the said article scraper elements all the edges of which are free and of equal resiliency, the corners of the said scraper elements being of greater resiliency.

JOHN S. ANDERSON.

REFERENCES CITED

The following references are of record in the file of this patent:

UNITED STATES PATENTS

| Number | Name | Date |
|---|---|---|
| 383,132 | Johnson et al. | May 22, 1888 |
| 674,038 | Obey | May 14, 1901 |
| 954,497 | Bemis | Apr. 12, 1910 |
| 1,501,863 | Nielsen | July 15, 1924 |
| 1,746,877 | Tompkins | Feb. 11, 1930 |
| 1,838,752 | Elfstedt | Dec. 29, 1931 |
| 1,966,465 | Schumacher | July 17, 1934 |
| 1,991,546 | Czapar | Feb. 19, 1935 |
| 2,036,449 | Weatherhead | Apr. 7, 1936 |
| 2,179,758 | Schlueter | Nov. 14, 1939 |
| 2,232,321 | Gibson | Feb. 18, 1941 |

FOREIGN PATENTS

| Number | Country | Date |
|---|---|---|
| 379,901 | Germany | Aug. 30, 1923 |